(12) United States Patent
Cohen

(10) Patent No.: US 6,886,377 B2
(45) Date of Patent: May 3, 2005

(54) TREE STAND LOCK AND ASSOCIATED METHOD OF USE

(76) Inventor: Warren Cohen, 10981 Decatur Rd., Philadelphia, PA (US) 19154

( * ) Notice: Subject to any disclaimer, the term of this patent is extended or adjusted under 35 U.S.C. 154(b) by 0 days.

(21) Appl. No.: 10/647,160

(22) Filed: Aug. 25, 2003

(65) Prior Publication Data

US 2005/0044905 A1    Mar. 3, 2005

(51) Int. Cl.[7] .................. E05B 73/00; A01M 31/02
(52) U.S. Cl. .................. 70/62; 70/230; 70/232; 182/187; 248/553
(58) Field of Search .................. 70/14, 58, 61–63, 70/181, 230, 232, 370–371, 448, 451, 466; 182/187; 248/551–553

(56) References Cited

U.S. PATENT DOCUMENTS

| | | | |
|---|---|---|---|
| 3,711,894 A * | 1/1973 | Walters | 70/91 |
| 3,769,821 A * | 11/1973 | Randel | 70/33 |
| 4,038,843 A * | 8/1977 | Daley, Jr. | 70/58 |
| 4,548,060 A * | 10/1985 | Campbell | 70/91 |
| 4,557,458 A * | 12/1985 | Vahlberg et al. | 70/58 |
| 5,127,244 A * | 7/1992 | Myers | 70/2 |
| 5,345,794 A * | 9/1994 | Jenks | 70/14 |
| 5,433,094 A * | 7/1995 | Sandin et al. | 70/58 |
| 6,390,239 B1 * | 5/2002 | McClain | 182/187 |
| 2003/0062220 A1 * | 4/2003 | Lewis et al. | 182/187 |

* cited by examiner

*Primary Examiner*—Daniel P. Stodola
*Assistant Examiner*—Christopher Boswell
(74) *Attorney, Agent, or Firm*—LaMorte & Associates

(57) ABSTRACT

A device and method for locking an object to a tree. The device includes an eyebolt. The eyebolt is set into the tree proximate the object to be protected. A protective bracket is placed over both the eyebolt and the object. A hole is disposed in the protective bracket that aligns with the head of the eyebolt when the protective bracket is placed over the eyebolt. A lock is provided having an elongated body that extends into the hole in the protective bracket and into the eye of the eyebolt. The lock therefore interconnects the protective bracket to the eyebolt and prevents the protective bracket from being removed.

13 Claims, 5 Drawing Sheets

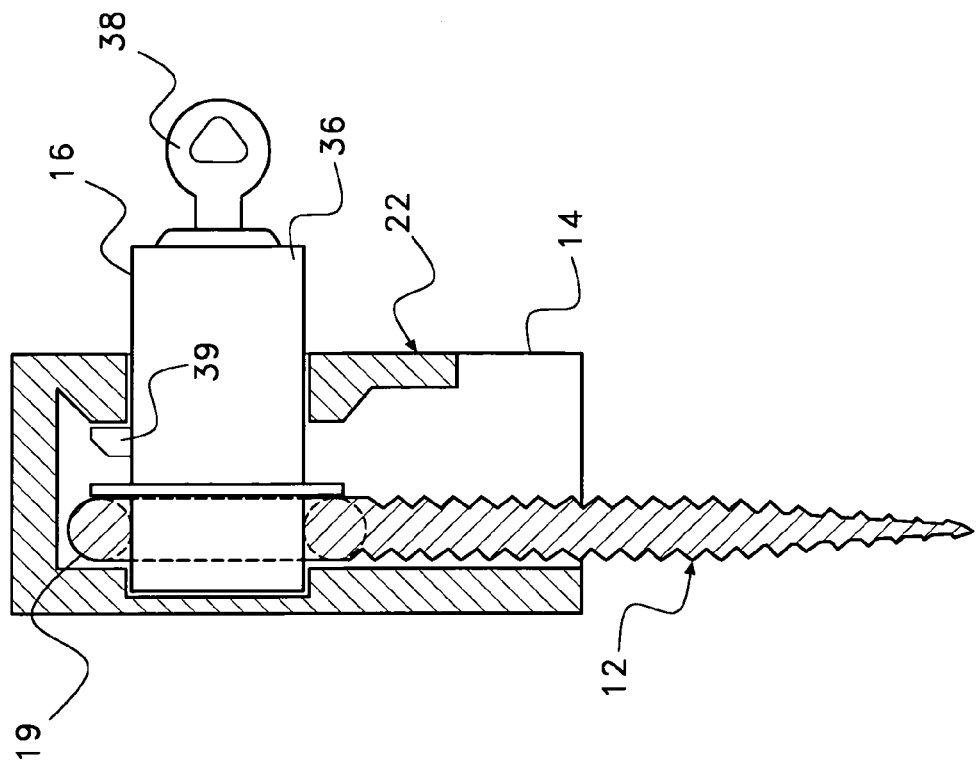
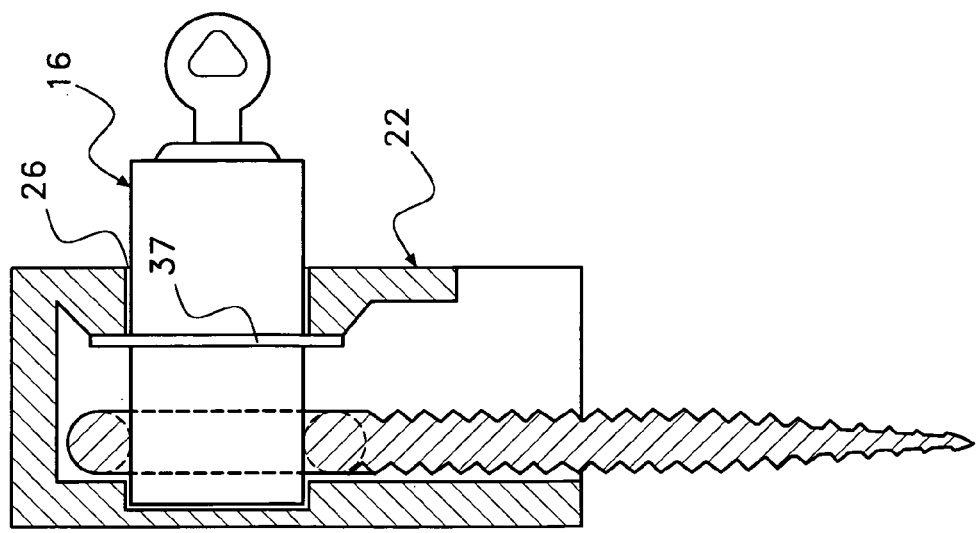

TREE STAND LOCK AND ASSOCIATED METHOD OF USE

BACKGROUND OF THE INVENTION

1. Field of the Invention

The present invention relates to locking devices for locking a tree stand in place in a tree, thereby preventing an unattended tree stand from being stolen.

2. Description of the Prior Art

Throughout history, hunters have climbed trees in wait of prey. By climbing a tree, a hunter leaves the typical line of sight of most walking animals. Furthermore, the hunter elevates the source of his/her scent so the scent is not strong at ground level. This greatly increases the likelihood that an animal will approach the location of the hunter, while still being unaware of the hunter.

Although many tree stands are built in trees using wood, many hunters use commercially available tree stands that are prefabricated. In this manner, a hunter can carry the tree stand to different places depending upon the season and hunting conditions. Most prefabricated tree stands provide a seating surface that connects to the main trunk of the tree. The tree stand typically connects to the tree with straps, so as to be easily removable and not to cause damage to the tree.

Hunters often place their tree stands in trees and leave the tree stand. This is especially true in places with a short hunting season, where hunters tend to leave the tree stand in a tree for the duration of the hunting season. This marks the tree and prevents other hunters from setting their tree stands in that same tree. After setting a tree stand in place, a hunter may go home for an evening or a few days, intending to return to the tree stand at a later time. Accordingly, it is not unusual to come across an unattended tree stand in tree, especially during hunting season.

Since tree stands are left unattended, it should come as no surprise that some tree stands do get stolen. This can be done by criminals, competitors, vandals or animal rights activists. To help prevent such thefts from occurring, locking devices have been developed to help retain the tree stand in place. Such prior art locking devices are exemplified by U.S. Pat. No. 6,390,239 to McClain, entitled Tree Stand Theft Prevention Devices.

A problem associated with prior art tree stand locking devices, such as that shown in the McClain patent, is that the locking device itself is bolted into the tree using a common lag bolt and a wrench. A lock then obstructs access to the head of the lag bolt, so that a thief with a wrench cannot remove the bolt from the tree. However, to install such a lock system, a hunter must drive a large lag bolt into the side of a tree at an elevated position. This cannot be done without a wrench. As such, the hunter must carry wrench with him that will be used to drive the lag bolt into the tree. The wrench must be carried up into the tree and used while elevated in the tree. This often proves to be both difficult and dangerous.

A need therefore exists for an improved tree stand lock that can be installed and removed without tools. In this manner, the installation and removal of the tree stand can be made faster, easier and safer. This need is met by the present invention as described and claimed below.

BRIEF DESCRIPTION OF THE DRAWINGS

For a better understanding of the present invention, reference is made to the following description of exemplary embodiments thereof, considered in conjunction with the accompanying drawings, in which:

FIG. 2 is a selectively cross-sectioned view of the embodiment of the locking system shown in FIG. 1, shown in an unlocked condition;

FIG. 3 is a selectively cross-sectioned view of the embodiment of the locking system shown in FIG. 1, shown in a locked condition;

SUMMARY OF THE INVENTION

The present invention is a device and method for locking an object to a tree. The device includes an eyebolt having a threaded shaft and a head that defines an open eye. The eyebolt is set into the tree proximate the object to be protected. A protective bracket is placed over both the eyebolt and the object to be protected. The protective bracket has a central housing and at least one bracket arm that extends from the central housing. A hole is disposed in the central housing that aligns with the head of the eyebolt when the protective bracket is placed over the eyebolt. The eyebolt passes into the central housing section of the protective bracket and is isolated from external contact. The bracket arm extends over the object to be protected, thereby trapping that object between the bracket arm and the tree.

A lock is provided having an elongated cylindrical body that extends into the hole in the protective bracket and into the eye of the eyebolt. The lock interconnects the protective bracket to the eyebolt, thereby preventing the protective bracket from being removed. To release the object being protected, a key is used to release the lock. Once the lock is released, the protective bracket can be removed from the eyebolt and the object being protected.

DETAILED DESCRIPTION OF THE DRAWINGS

Although the present invention locking assembly can be used to lock a variety of different objects to a tree, it is particularly well suited to locking the frame of a tree stand to a tree. Accordingly, by way of example, the present invention locking assembly will be illustrated and described for use in locking the frame of a tree stand to the trunk of a tree in order to set forth the best mode of use contemplated for the invention.

Figure 1:
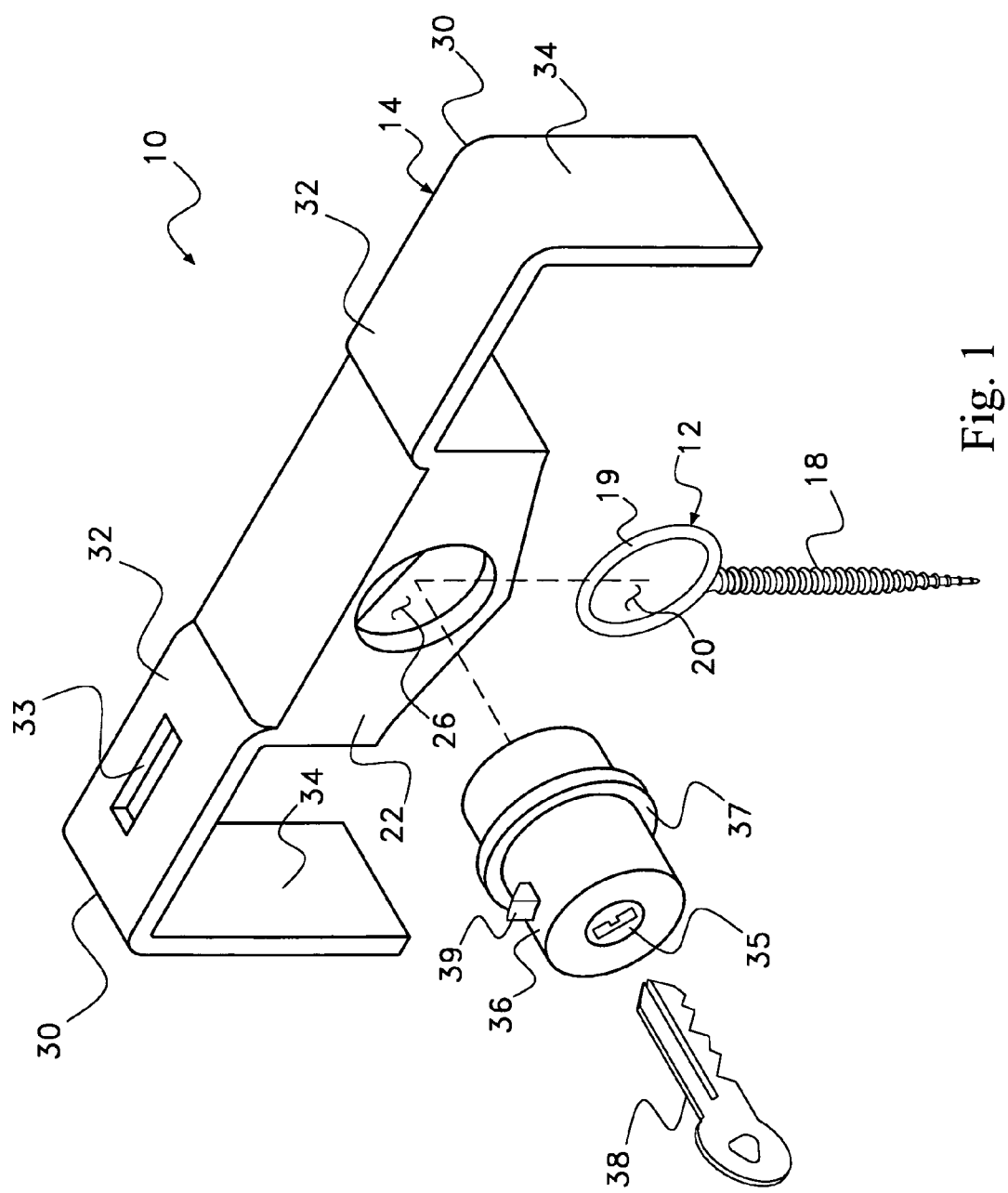
FIG. 1 is an exploded view of a preferred embodiment of the present invention locking system.

Referring to FIG. 1, an exploded view of an exemplary embodiment of the locking assembly 10 is shown. The locking assembly 10 is comprised of three primary parts, namely an eyebolt 12, a protective bracket 14 and a keyed lock 16. Although the keyed lock 16 is shown separated from the protective bracket 14, this is done just for clarity of illustration. As will later be understood, the keyed lock 16 mechanically interconnects with the protective bracket 14 so that it cannot be inadvertently dropped or otherwise separated from the protective bracket 14.

The eyebolt 12 is a standard commercially available eyebolt. The eyebolt 12 preferably has a threaded shaft 18 with a length of at least two inches. The head 19 of the eyebolt 12 defines and open eye 20 that has a preferred diameter of at least a half-inch.

The protective bracket 14 engages the eyebolt 12 in a manner that will later be described. The protective bracket 14 has a central housing 22. The central housing 22 is closed on all sides except the side facing the eyebolt, which is open. Accordingly, the head 19 of the eyebolt 12 is free to pass into the central housing 22 through the one open side.

A hole 26 extends through the base 25 of the central housing 22. The axis of the hole 26 is perpendicular to the shaft of the eyebolt 12. The hole 26 has a diameter no larger than the diameter of the eye 20 of the eyebolt 12. When the head 19 of the eyebolt 12 passes into the central housing 22, the eye 20 of the eyebolt 12 aligns with the hole 26. Accordingly, the hole 26 remains unobstructed by the presence of the head 19 of the eyebolt 12 within the central housing 22.

Bracket arms 30 extend from either side of the central housing 22. The bracket arms 30 are generally J-shaped, having a short section 32 and a long section 34. The short section 32 is coupled to the side of the central housing 22. The long section 34 extends forward beyond the central housing 22.

A slot 33 is formed in at least one of the bracket arms 30. The slot 33 is sized to receive the head 19 of the eyebolt 12. The slot 33 is used to install the eyebolt 12 into the trunk of a tree, as will later be explained.

A keyed lock 16 is provided. The keyed lock 16 has a cylindrical body 36 with an exterior diameter that enables the cylindrical body 36 of the keyed lock 16 to pass into both the hole 26 into the central housing 22 and the eye 20 of the eyebolt 12. A flange extension 37 radially extends from the cylindrical body 36. The flange extension 37 has a diameter that is larger than either the hole 26 in the central housing 22 or the eye 20 of the eyebolt. As will later be described, the flange extension 37 prevents the keyed lock 16 from falling out of the central housing 22 when unlocked. This prevents the keyed lock 16 from being inadvertently dropped when used up in a tree.

A keyhole 35 is present on the bottom of the keyed lock 36. The keyhole 35 can be engaged with a key 38. When the key 38 is turned, at least one locking protrusion 39 is retracted into the sides of the cylindrical body 36.

Referring to FIG. 2, it can be seen that the keyed lock 16 extends through the hole 26 in the central housing 22. The keyed lock 16 is free to move back and forth through the hole 26 until either the flange extension 37 contacts the central housing 22 around the hole 26 or else the keyed lock 16 strikes the rear of the central housing 22. The presence of the flange extension 37 prevents the keyed lock 16 from being fully removed from the central housing 22.

Referring to FIG. 3, it can be seen that the head 19 of the eyebolt 12 is advanced into the central housing 22 of the protective bracket 14. Once so positioned, the keyed lock 16 is momentarily moved to the side and the head 19 of the eyebolt 12 is concentrically aligned with both the hole 26 of the central housing 22 and the elongated body 36 of the keyed lock 16. The cylindrical body 36 of the keyed lock 16 is then moved through the eye 20 of the eyebolt 12. Once the cylindrical body 36 of the keyed lock 16 passes into the eye 20 of the eyebolt 12, the locking extension 39 engages from the cylindrical body 36 and locks the keyed lock 16 in place. The locking protrusion 39 prevents the keyed lock 16 from being pulled out of the eyebolt 12, until the key 38 is used to retract the locking protrusion 39.

Once the keyed lock 16 is locked in the central housing 22 of the protective bracket 14, the keyed lock 16 interconnects the eyebolt 12 to the protective bracket 14. The eyebolt 12 therefore cannot be turned unless the entire protective bracket 14 is turned.

Figure 4:
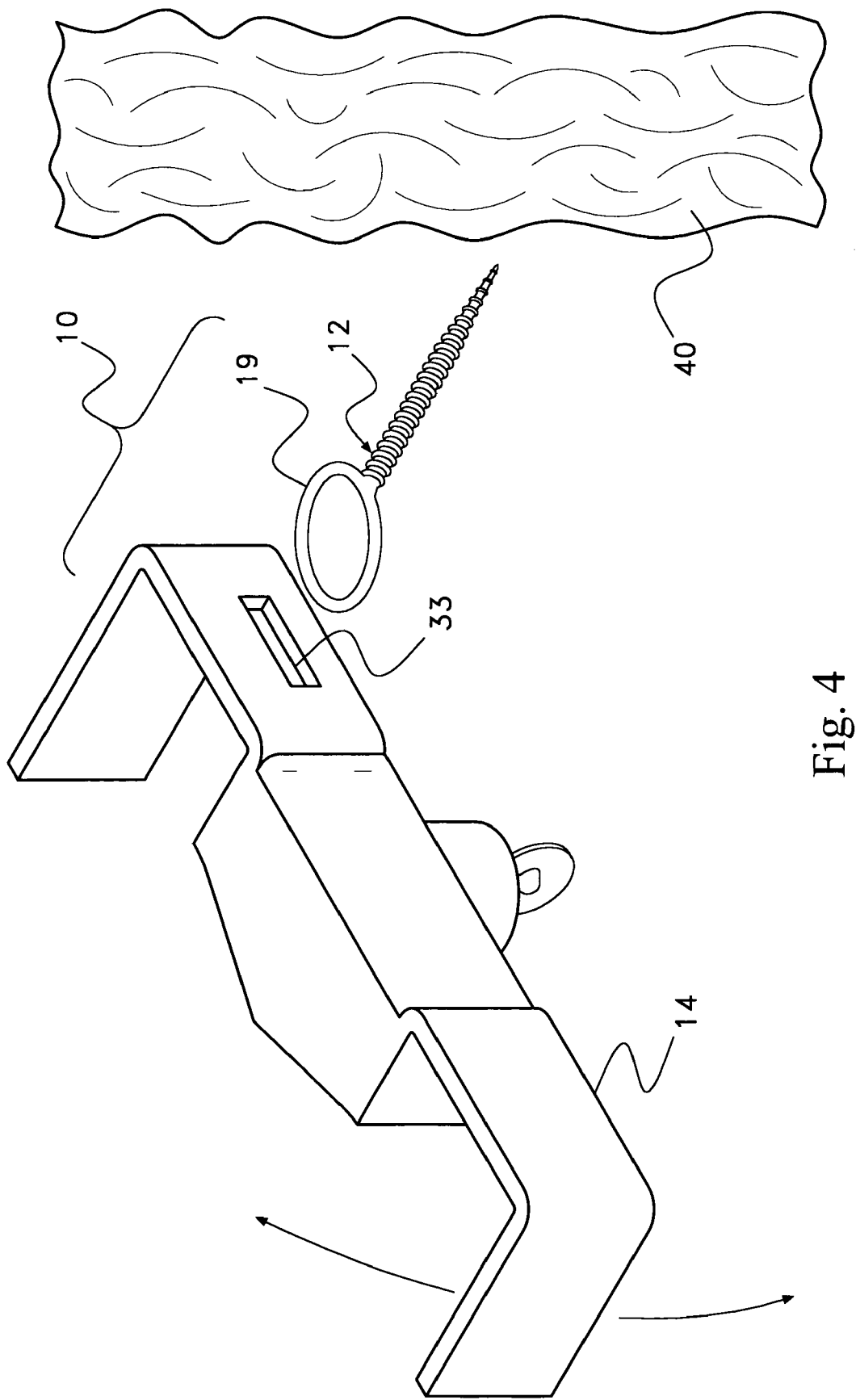
FIG. 4 is a perspective view of the first step involved in connecting the present invention locking system to a tree.

Referring now to FIG. 4, a preferred method of installation for the locking assembly 10 can be described. To install the locking assembly 10, the entire locking assembly 10 is brought into a tree having a tree trunk 40 with a diameter of at least eighteen inches. The eyebolt 12 is placed against the tree trunk 40 and can be hammered in place until it sticks, by impacting it with the protective bracket 14. The protective bracket 14 is then oriented so that the slot 33 formed in the protective bracket 14 passes over the head 19 of the eyebolt 12. The eyebolt 12 is then is screwed into the tree trunk 40 by rotating the protective bracket 14. The eyebolt 12 is driven into the tree trunk 40 until the protective bracket 14 itself contacts the tree trunk 40 and prevents further rotation of the protective bracket 14.

Figure 5:
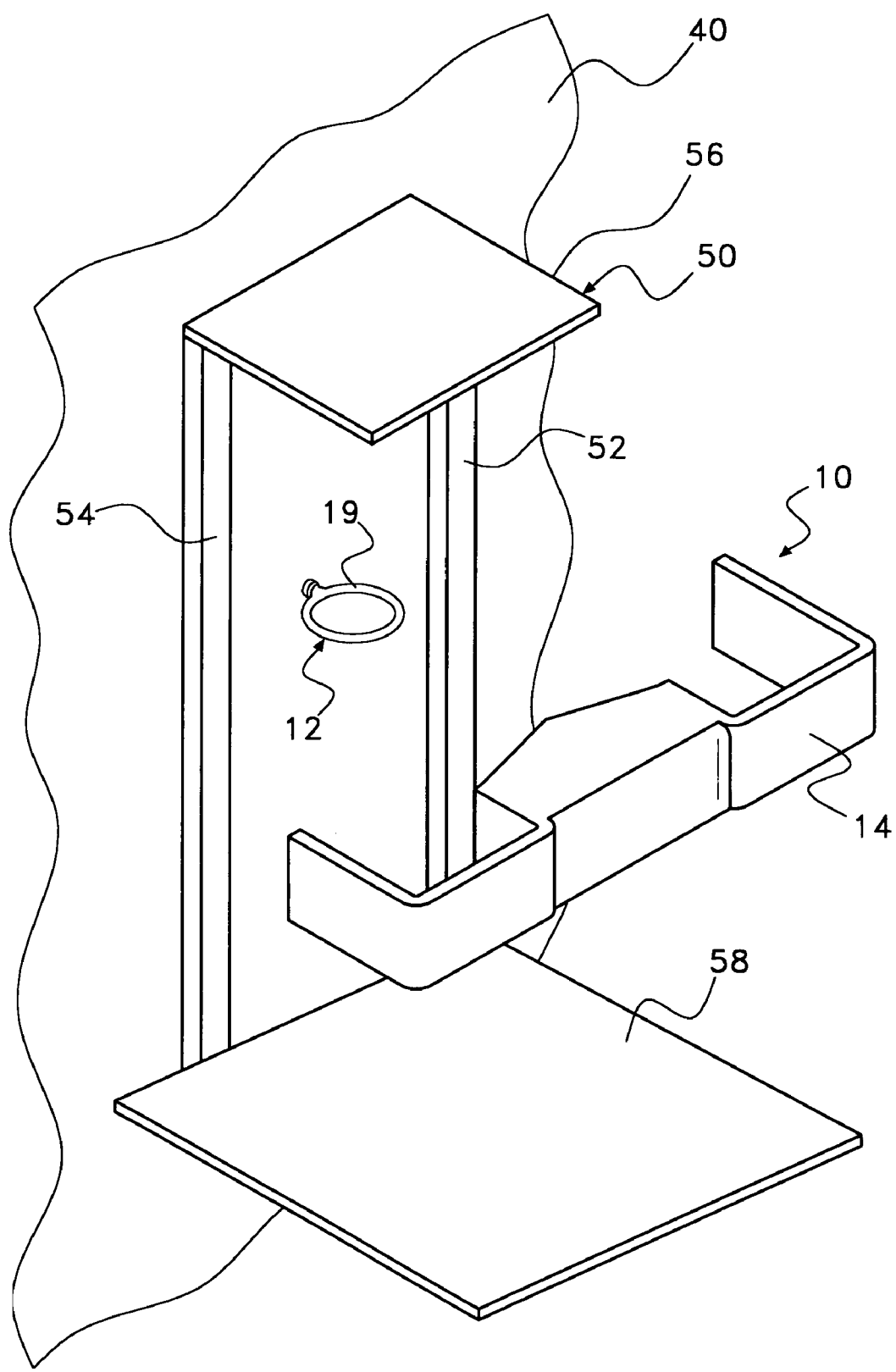
FIG. 5 is a perspective view of the second step involved in connecting the present invention locking system to a tree.

Referring to FIG. 5, it can be seen that once the eyebolt 12 is driven into the tree trunk 40 a tree stand 50 can then be connected to the tree trunk 40 over the area of the tree containing the eyebolt 12. Commercial tree stands traditionally contain two vertical framing elements 52, 54 that interconnect a seat platform 56 to a standing platform 58. The tree stand 50 is connected to the tree trunk 40 so that the eyebolt 12 is centrally positioned between the two vertical framing elements 52, 54 at some point along the length of the two framing elements 52, 54.

Once the tree stand 50 is in place, the protective bracket 14 is again placed over the head 19 of the eyebolt 12. The keyed lock 16 (FIG. 3) is then set in place, thereby interconnecting the protective bracket 14 to the eyebolt 12.

Figure 6:
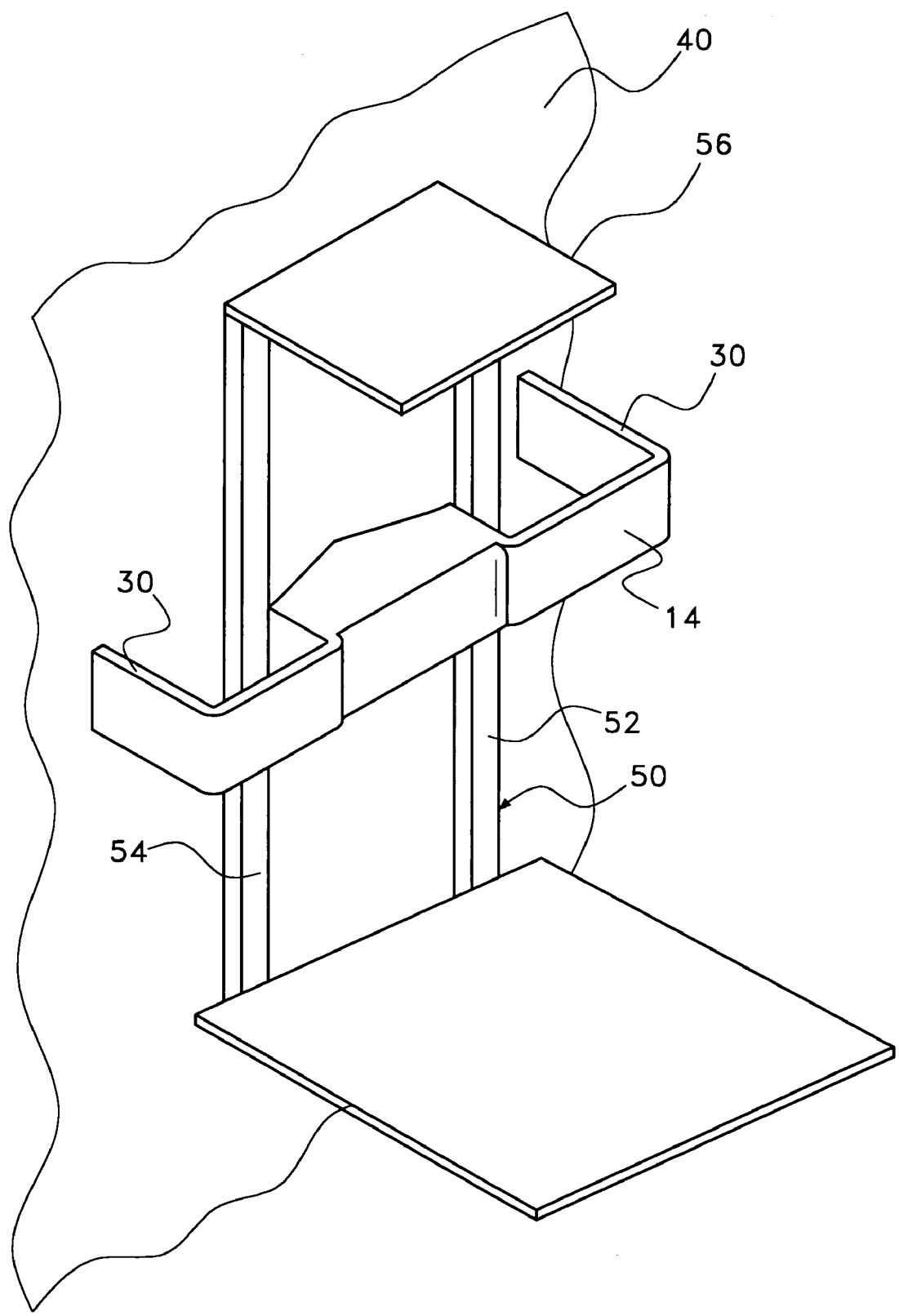
FIG. 6 is a perspective view showing the present invention locking system fully installed on a tree and being used to lock a tree stand in place.

Referring lastly to FIG. 6, it can be seen that the bracket arms 30 of the protective bracket 14 pass over the vertical frame elements 52, 54 of the tree stand 50. The protective bracket 14 is then locked back onto the head of the eyebolt 12 (FIG. 5) using the keyed lock 16 (FIG. 3). Once locked in place, it can be seen that the vertical frame elements 52, 54 of the tree stand 50 are trapped between the bracket arms 30 of the protective bracket 14 and the tree trunk 40. Thus, the tree stand 50 cannot be non-destructively removed from the tree trunk 40 unless the protective bracket 14 is removed. However, the protective bracket 14 can only be removed by a person with the proper key who must first remove the keyed lock 16 (FIG. 3) and disengage the protective bracket 14 from the eyebolt 12 (FIG. 5).

With reference to FIGS. 6, 5, 4 and 3, respectively, it will be understood that to remove the present invention locking assembly from the tree trunk 40, the method steps described above are reversed. The protective bracket 14 is unlocked and removed. The tree stand 50 is removed. The protective bracket 14 is again used to engage the eyebolt 12, wherein the protective bracket 14 is used to rotate and remove the eyebolt 12 without tools.

It will be understood that the embodiments of the present invention locking assembly that are described and illustrated herein are merely exemplary and a person skilled in the art can make many variations to the embodiment shown without departing from the scope of the present invention. For example, the length and shape of the protective bracket can be changed to accommodate trees of different widths. Furthermore, the eye of the eyebolt, keyed lock and hole in the protective bracket need not be round. Any geometric shape can be used provided the shape is consistent and the parts interconnect in the manner described. All such variations, modifications and alternate embodiments are intended to be included within the scope of the present invention as defined by the appended claims.

What is claimed is:

1. A device for locking an object to a tree, comprising:
   an eyebolt having a threaded shaft and a head that defines an open eye;
   a protective bracket having a central housing and at least one bracket arm that extends from said central housing, wherein said central housing receives said eye of said eyebolt therein, and wherein said central housing defines a hole that is aligned with said eye of said eyebolt; and
   a lock having an elongated body that extends into said hole and through said eye of said eyebolt, thereby interlocking said protective bracket to said eyebolt.

2. The device according to claim 1, wherein said lock has a first open configuration and a second locked configuration where said lock is set in a fixed position within said central housing when in said locked configuration, wherein said lock is selectively converted between said open configuration and said locked configuration with a key.

3. The device according to claim 1, wherein said protective bracket has two bracket arms that extend from opposite sides of said central housing.

4. The device according to claim 1, wherein said central housing envelops said head of said eyebolt and prevents access to said eyebolt when locked to said head of said eyebolt.

5. A method of attaching a locking device to a tree, comprising the steps of:
   advancing an eyebolt into a tree, wherein said eyebolt has a head that defines on open eye;
   placing a protective bracket over said eyebolt, wherein said protective bracket defines a hole that aligns with said open eye of said eyebolt;
   advancing a lock through said eye of said eyebolt, therein locking said protective bracket to said eyebolt.

6. The method according to claim 5, wherein said step of advancing an eyebolt into a tree includes connecting said protective bracket to said eyebolt and rotating said protective bracket to screw said eyebolt into a tree.

7. The method according to claim 5, wherein said step of placing a protective bracket over said eyebolt envelops said eyebolt between said protective bracket and the tree, thereby isolating said head of said eyebolt.

8. A method of locking a tree stand to a tree to prevent theft, said method comprising the steps of:
   advancing an eyebolt into a tree, wherein said eyebolt has a head that defines on open eye;
   attaching a tree stand to the tree proximate said eyebolt;
   placing a protective bracket over said eyebolt, said protective bracket having at least one bracket arm that passes over a section of said tree stand, wherein said protective bracket defines a hole that aligns with said open eye of said eyebolt;
   advancing a lock through said eye of said eyebolt, therein locking said eyebolt to said protective bracket.

9. The method according to claim 8, wherein said tree stand has two framing elements that abut a tree and said step of attaching a tree stand to the tree proximate said eyebolt includes advancing said eyebolt into the tree between said framing elements.

10. The method according to claim 9, wherein said protective bracket has two bracket arms and said step of placing a protective bracket over said eyebolt includes passing said bracket arms around said framing elements of said tree stand.

11. The method according to claim 8, wherein said step of advancing an eyebolt into a tree includes connecting said protective bracket to said eyebolt and rotating said protective bracket to screw said eyebolt into a tree.

12. The method according to claim 11, wherein said step of placing a protective bracket over said eyebolt envelops said eyebolt between said protective bracket and the tree, thereby isolating said head of said eyebolt.

13. A method of attaching a locking device to a tree, comprising the steps of:
   providing a protective bracket, wherein said protective bracket defines a hole;
   providing an eyebolt having a head that defines an open eye;
   advancing said eyebolt into a tree by engaging said eyebolt with said protective bracket and rotating said protective bracket to screw said eyebolt into a tree;
   placing said protective bracket over said eyebolt, wherein said hole aligns with said open eye of said eyebolt; and
   advancing a lock through said eye of said eyebolt, therein locking said protective bracket to said eyebolt.

* * * * *